United States Patent
Nestl et al.

(10) Patent No.: US 10,280,079 B2
(45) Date of Patent: May 7, 2019

(54) METHOD FOR PRODUCING HYDROGEN

(71) Applicant: Rouge H2 Engineering GmbH, Graz (AT)

(72) Inventors: Stephan Nestl, Graz (AT); Viktor Hacker, Graz (AT); Gernot Voitic, Kumberg (AT)

(73) Assignee: Rouge H2 Engineering GmbH, Graz (AT)

( * ) Notice: Subject to any disclaimer, the term of this patent is extended or adjusted under 35 U.S.C. 154(b) by 0 days.

(21) Appl. No.: 15/328,811

(22) PCT Filed: Jul. 27, 2015

(86) PCT No.: PCT/AT2015/050177
§ 371 (c)(1),
(2) Date: Jan. 24, 2017

(87) PCT Pub. No.: WO2016/011473
PCT Pub. Date: Jan. 28, 2016

(65) Prior Publication Data
US 2017/0210622 A1    Jul. 27, 2017

(30) Foreign Application Priority Data
Jul. 25, 2014 (AT) .............................. A 50526/2014

(51) Int. Cl.
*C01B 3/22* (2006.01)
*C01B 3/10* (2006.01)
(Continued)

(52) U.S. Cl.
CPC .............. *C01B 3/105* (2013.01); *B01J 19/24* (2013.01); *C01B 3/061* (2013.01); *C01B 3/063* (2013.01);
(Continued)

(58) Field of Classification Search
CPC .............. B01J 19/24; C01B 2203/0255; C01B 2203/0261; C01B 2203/0495;
(Continued)

(56) References Cited

U.S. PATENT DOCUMENTS 3,880,987 A    4/1975   Nahas
3,985,866 A *  10/1976  Oda .................... C01B 3/061
                                                        423/657
(Continued)

FOREIGN PATENT DOCUMENTS

CA    1063775      10/1979
CN    201634417 U  11/2010
(Continued)

OTHER PUBLICATIONS

Written Opinion for PCT/AT2015/050177 dated Nov. 26, 2015 (6 pages).
(Continued)

Primary Examiner — Amber R Orlando
Assistant Examiner — Syed T Iqbal
(74) Attorney, Agent, or Firm — Thrive IP®; Jeremy M. Stipkala

(57) ABSTRACT

The present invention relates to a device for producing compressed hydrogen, comprising a pressure-resistant reactor (1) with a reactor chamber having a metal-containing contact mass (2), wherein the reactor (1) comprises at least one feed line (3) for feeding fluids into the reactor chamber and at least one discharge line (4) for discharging fluids from the reactor chamber, wherein the at least one discharge line is provided with a device (5a, 5b, 5c, 5d) for controlling or regulating the flow rate, preferably having a valve, for adjusting the pressure within the reactor chamber, wherein a conveyance means is provided on at least one feed line for introducing a water-containing medium into the reactor
(Continued)

chamber and wherein at least one discharge line (4) protrudes into the reactor chamber or opens directly into the reactor chamber, through which the compressed hydrogen is discharged from the reactor chamber, wherein the reactor chamber exhibits at least two areas that are separate from each other and connected in a gas-conducting manner, of which at least one area comprises the metal-containing contacting mass (2) and at least one additional area comprises at least one inert material (7, 13).

16 Claims, 6 Drawing Sheets

(51) Int. Cl.
 C01B 3/06 (2006.01)
 C01B 3/08 (2006.01)
 C01B 3/36 (2006.01)
 C01B 3/38 (2006.01)
 B01J 19/24 (2006.01)

(52) U.S. Cl.
 CPC ............... *C01B 3/08* (2013.01); *C01B 3/10* (2013.01); *C01B 3/36* (2013.01); *C01B 3/386* (2013.01); *C01B 2203/0255* (2013.01); *C01B 2203/0261* (2013.01); *C01B 2203/04* (2013.01); *C01B 2203/0495* (2013.01); *C01B 2203/06* (2013.01); *C01B 2203/107* (2013.01); *C01B 2203/1047* (2013.01); *C01B 2203/1052* (2013.01); *C01B 2203/1058* (2013.01); *C01B 2203/1064* (2013.01); *C01B 2203/1241* (2013.01); *Y02E 60/36* (2013.01)

(58) Field of Classification Search
 CPC ........ C01B 2203/06; C01B 2203/1241; C01B 3/105; C01B 3/36; C01B 3/386
 See application file for complete search history.

(56) References Cited

U.S. PATENT DOCUMENTS

| | | | | |
|---|---|---|---|---|
| 6,395,252 | B1* | 5/2002 | Getty | ................. C01B 3/08 |
| | | | | 423/648.1 |
| 2001/0055559 | A1 | 12/2001 | Sanfilippo et al. | |
| 2004/0009379 | A1* | 1/2004 | Amendola | ............. B01J 7/02 |
| | | | | 422/600 |
| 2007/0217972 | A1* | 9/2007 | Greenberg | ............. B01J 7/02 |
| | | | | 422/232 |

FOREIGN PATENT DOCUMENTS

| | | |
|---|---|---|
| DE | 279726 C | 8/1913 |
| DE | 2507612 A1 | 9/1975 |
| EP | 1134187 A2 | 9/2001 |
| GB | 902338 A | 8/1962 |
| JP | 2005206459 A | 8/2005 |
| WO | 2011028133 A1 | 3/2011 |

OTHER PUBLICATIONS

International Search Report for PCT/AT2015/050177 dated Nov. 26, 2015 (3 pages).
Austrian Search Report for Austrian Application A 50526/2014 dated Jun. 22, 2015 (1 page).
Machine translation of DE 279726 C (2 pages).
English Abstract for JP 2005 206459 A (1 page).
Machine translation using PatBase for JP 2005206459 A (14 pages).
Examination Report No. 1 for AU Patent Application No. 2015292237 dated Jun. 6, 2018 (3 pages).
The First Office Action for CN Patent Application No. 201580050859.6 dated Sep. 29, 2018 (11 pages).
Machine Translation of the First Office Action for CN Patent Application No. 201580050859.6 dated Sep. 29, 2018 (12 pages).
Machine Translation of CN201634417U (9 pages).

\* cited by examiner

METHOD FOR PRODUCING HYDROGEN

This application represents the U.S. National Phase under 35 U.S.C. § 371 of International Patent Application No. PCT/AT2015/050177, filed internationally on Jul. 27, 2015, which claims benefit of priority of Austrian Patent Application No. A 50526/2014, filed on Jul. 25, 2014; the foregoing International Application and Austrian Patent Application are incorporated herein by reference in their entirety.

The present invention relates to a method for producing compressed hydrogen.

Hydrogen is an important energy carrier, the significance of which has increased in recent years, since hardly any pollutants and no fine dust particles are produced when burning hydrogen. An advantageous combustion reaction of this type is desirable in particular in internal combustion engines for road vehicles. In addition, hydrogen is used increasingly for energy recovery in fuel cells. Currently, however, the majority of the produced hydrogen is used in the chemical industry.

Hydrogen is nowadays primarily produced with the aid of steam reforming, partial oxidation, and autothermal reforming. In these methods, a synthesis gas rich in CO is produced, and therefore these methods often are combined with the water-gas shift reaction, in order to produce a mixture of hydrogen and carbon dioxide. If a partial oxidation and autothermal reforming is used, air is additionally introduced, and the produced hydrogen is additionally diluted with large amounts of nitrogen from the air. In order to separate this added nitrogen, $CO_2$, unreacted CO and starting material from the produced hydrogen, additional purification steps are necessary. This purification is usually performed by pressure swing adsorption or monoethanolamine scrubbing.

Document GB 902 338 describes methods and devices for producing compressed hydrogen. Here, steam is brought into contact with iron particles, whereby hydrogen and also iron oxide are formed. The formed iron oxide is reduced in a further step to iron and is fed back into the hydrogen production step.

DE 279726 from the year 1913 describes a method for producing hydrogen in which superheated steam is conveyed over heated metals. The retort in which this method is performed has an opening for discharging the hydrogen, at which opening there is arranged a pipeline provided with valves.

A method for producing compressed hydrogen is disclosed in U.S. Pat. No. 3,880,987, in which method steam is brought into contact with metal tin and tin oxide.

DE 2507612 describes a method for producing hydrogen, in which tungsten dioxide is used as catalyst. During the course of this method, steam is brought into contact with the catalyst at a temperature of less than 700° C.

Further methods for producing hydrogen include the use of membrane reactors, electrolysis, or chemical looping reactions.

All of the methods known from the prior art for producing hydrogen have different disadvantages. On the one hand, hydrogen contaminated with nitrogen, $CO_2$, unreacted CO and starting material is produced by these methods. In order to purify this hydrogen, additional methods and devices are required, which makes the production of hydrogen by means of these methods time-consuming and costly. With the aid of electrolysis, it would indeed be possible to produce pure hydrogen, however this type of production is economical only with availability of favourable power sources. On the other hand, the hydrogen produced by means of these methods usually is not compressed. In other words, in order to produce compressed hydrogen, a device for compressing hydrogen is additionally required.

The storage and the transport of hydrogen pose a further problem. Hydrogen is usually stored in pressure vessels. As a result of compression by means of compressors and optional cooling, hydrogen can be introduced into and stored in pressure vessels in a compressed or liquid form. A key problem in liquefying and compressing hydrogen is the high energy expenditure and also the equipment costs. In addition, this type of storage poses the risk that the vessels or the valves fitted thereon may burst as a result of the high internal pressure. Alternative forms for storage of hydrogen are based on solids or liquids (for example metal hydride storage and adsorption storage).

The object of the present invention is, inter alia, to provide an alternative method and a device for producing compressed hydrogen, which method and device overcome the disadvantages of the prior art.

The present invention relates to a device for producing compressed hydrogen comprising a pressure-resistant reactor with a reactor chamber having a metal-containing contact mass, wherein the reactor comprises at least one feed line for feeding fluids into the reactor chamber and at least one discharge line for discharging fluids from the reactor chamber, wherein the at least one discharge line is provided with a device for controlling or regulating the flow rate, preferably having a valve, for adjusting the pressure within the reactor chamber, wherein a conveyance means is provided on at least one feed line for introducing a water-containing medium into a reactor chamber, and wherein at least one discharge line protrudes into the reactor chamber or opens directly into the reactor chamber, through which compressed hydrogen is discharged from the reactor chamber, wherein the reactor chamber has at least two areas that are separate from each other and are connected to each other in a gas-conducting manner, of which at least one area comprises the metal-containing contact mass and at least one additional area comprises at least one inert material.

A further aspect of the present invention relates to a method for producing compressed hydrogen in a device according to the invention comprising a step of introducing a water-containing medium into a reactor chamber of a pressure-resistant reactor of this device by means of a conveyance means, preferably a pump, wherein the reactor chamber comprises a metal-containing contact mass, wherein the water-containing medium is evaporated before or in the reactor chamber, whereby the pressure within the reactor chamber rises above the ambient pressure, and the evaporated water is reacted with the metal of the contact mass to form hydrogen, and the metal is reacted to form metal oxide, wherein the compressed hydrogen is discharged from the reactor chamber by means of a line protruding into the reactor chamber or opening directly into the reactor chamber, wherein the pressure within the reactor chamber is controlled or regulated using a device, provided on the discharge line, for controlling or regulating the flow rate, preferably using a valve.

The reactors used in the method according to the invention enable the production of compressed hydrogen without the use of compressors which compress the hydrogen usually produced at normal pressure. In accordance with the invention, a water-containing medium (water or steam) is brought into contact with a metal-containing contact mass. Hydrogen is released due to the oxidation of the metal in the metal-containing contact mass at a temperature of preferably 300° C. to 1200° C., even more preferably 400° C. to 1000° C., particularly preferably from 450° C. to 950° C. The devices for controlling or regulating the flow rate at the openings located on the reactor make it possible for the pressure within the reactor to rise as a result of the evaporation of the water in the reactor chamber. The formed hydrogen is thus present likewise under this pressure. If a conveyance means (for example pump) is used to introduce a water-containing medium into the reactor, this must maintain the pressure and must build up a corresponding counter pressure by conveyance of the medium. If a specific pressure within the reactor chamber is reached, the reactor chamber can be closed in the area of the conveyance means using a device for controlling or regulating the flow rate, preferably using a valve. The pressure formed within the reactor during the course of the reaction can thus be maintained, and compressed hydrogen can be removed from the reactor at a later time. In addition, with the device according to the invention, a specific amount of water or steam can be introduced initially into the reactor, which can then be closed. Due to the feeding of heat, the pressure within the reactor chamber rises accordingly. By contrast, in the case of the methods known from the prior art for hydrogen production, the pressure in the corresponding reactors is generated by bringing the steam at high pressure into contact with a suitable contact mass. In other words, the pressure is built up in such systems by introducing the steam by means of pressure (for example see GB 902 338). Further technical measures in the hydrogen production are thus necessary.

If a desired pressure is reached, the valve on a discharge line is opened for example, whereby hydrogen can be drained under a defined pressure. Once a desired pressure has built up within the reactor, compressed hydrogen can thus be directly discharged from the reactor by means of a line provided with a device for controlling or regulating the flow rate (for example a valve). The compressed hydrogen can be discharged continuously by using the conveyance means to introduce water into the reactor at the same time as the discharge. The discharge amount of compressed hydrogen can be determined by the device for controlling or regulating the flow rate at the discharge opening. The pressure within the reactor is thus also controlled or regulated.

The metal of the metal-containing contact mass is a metal which reduces at least in part by hydrogen, carbon monoxide, or gaseous hydrocarbons under the given temperatures and which also can be oxidised at least in part with steam, resulting in the formation of hydrogen. Such metals are sufficiently known to a person skilled in the art, wherein iron, tungsten, molybdenum and germanium are particularly suitable.

The terms "reduced at least in part" and "oxidised at least in part", as used herein, mean respectively that the metal or metal oxide is oxidised and reduced either completely or only in part. An example for partial reduction is the reduction of $Fe_3O_4$ to $FeO$, for example.

In accordance with a preferred embodiment of the present invention, the pressure within the reactor chamber is controlled by the conveyance means and one or more devices for controlling the flow rate in lines leading into and from the reactor chamber.

The pressure within the reactor chamber is preferably controlled or regulated by the conveyance means with which the water-containing medium is introduced into the reactor. In order to generate a corresponding counter pressure in the reactor, whereby the pressure within the reactor can be increased above the ambient pressure, devices for controlling or regulating the flow rate in the lines leading into and from the reactor chamber are disposed on said lines. Devices for controlling the flow rate are preferably valves. Stop valves, flow control valves, check valves, pressure valves and/or directional valves are particularly preferred.

In accordance with a further preferred embodiment of the present invention, the pressure when reacting evaporated water with the metal of the contact mass to form hydrogen and when reacting the metal or the metals to form metal oxide is at least 2 bar, preferably at least 3 bar, preferably at least 4 bar, preferably at least 5 bar, even more preferably at least 6 bar, even more preferably at least 7 bar, even more preferably at least 8 bar, even more preferably at least 9 bar, in particular at least 10, 15, 20, 25, 30, 40, 50, 60, 70, 80, 90, 100, 150, 200, 250 or 300 bar. The pressure during the reaction particularly preferably is, or rises to at most 400, 350, 300, 250, 200, 150, 100, 90, 80, 70, 60 or 50 bar, depending on the pressure resistance of the reactor used, the lines, and the connections to the devices for controlling the flow rate. In addition, the pressure during the reaction is preferably between 2 and 400 bar, between 2 and 350 bar, between 2 and 300 bar, between 2 and 250 bar, between 2 and 200 bar, between 2 and 150 bar, between 2 and 100 bar, between 2 and 80 bar, between 2 and 60 bar, between 5 and 400 bar, between 5 and 400 bar, between 5 and 400 bar, between 5 and 350 bar, between 5 and 300 bar, between 5 and 250 bar, between 5 and 200 bar, between 5 and 150 bar, between 5 and 100 bar, between 5 and 80 bar, or between 5 and 60 bar. A pressure range between 2 and 250 bar, even more preferably between 5 and 200 bar, is particularly preferred.

The metal-containing contact mass preferably has the form of a metal sponge, pellet, powder, granulate, or a combination thereof. Methods for producing contact masses of this type are sufficiently known to a person skilled in the art. The metal-containing contact mass which is brought into contact with the water of the water-containing medium or with the steam can have any form in principle. Contact masses which are mechanically stable and which have a sufficiently large surface for the reaction of water to form hydrogen are particularly preferred.

In accordance with a preferred embodiment of the present invention, the metal-containing contact mass comprises a metal and/or metal oxide selected from the group consisting of iron, iron oxide, molybdenum, molybdenum oxide, tungsten, tungsten oxide, germanium, germanium oxide, and combinations thereof. The use of iron or iron oxide in the metal-containing contact mass is particularly preferred.

The metal-containing contact mass used in accordance with the invention can comprise the aforementioned metals or metal oxides in any amount and in any ratios.

In accordance with a preferred embodiment of the present invention, the contact mass additionally comprises metal oxides in order to increase the stability and reactivity of the contact mass. Suitable additional metal oxides are preferably selected from the group consisting of $CoO$, $GeO_2$, $CuO$, $NiO_2$, $PtO_2$, $Na_2O$, $In_2O_3$, $Li_2O$, $WO_3$, $Ag_2O$, $ZnO$, $RuO$, $NiO$, $Fe_2O_3$, $RuO_2$, $Ga_2O_3$, $PtO$, $Nb_2O_5$, $MnO_2$, $In_2O_3$, $PdO$, $K_2O$, $SnO_2$, $TiO_2$, $Cr_2O_3$, $HfO$, $ZrO_2$, $VO_2$, $CeO_2$, $Y_2O_3$, $CaO$, $MoO_2$, $SiO_2$, $La_2O_3$, $MgO$, $SC_2O_3$, $SrO$, $Al_2O_3$, and combinations thereof. The proportion of the active metals (such as iron, molybdenum, tungsten and germanium) in the metal-containing contact mass is preferably higher than that of the non-reactive additives or metal oxides (such as $Al_2O_3$ and $ZrO_2$). The metal-containing contact mass accordingly comprises at least 60%, preferably at least 70%, preferably at least 80%, preferably at least 90%, preferably at least 95%, even more preferably at least 99% active metals. In this context, "active" means that the material/metal can be reduced at least in part by hydrogen, carbon monoxide or gaseous hydrocarbons under the given temperatures and also can be oxidised at least in part with steam, resulting in the formation of hydrogen.

In accordance with the present invention, the reactor chamber has at least two areas that are separate from each other and are connected to each other in a gas-conducting manner, of which at least one area comprises the metal-containing contact mass and at least one additional area comprises at least one inert material.

The line protruding into the reactor chamber preferably protrudes into the area comprising the inert material, and the compressed hydrogen is discharged from the reactor chamber via the area comprising the inert material. It is thus made possible that the hydrogen recovered from the reactor chamber contains fewer impurities compared to hydrogen produced in the conventional manner.

The contact mass disposed in the reactor chamber of the device according to the invention remains in the reactor according to the invention during the entire method and during the reduction of said contact mass after the hydrogen production. This has the advantage that the contact mass does not have to be transferred into a regeneration reactor and therefore does not have to be moved. The area of the reactor chamber comprising the contact mass is thus considered to be a fixed-bed reactor. The fact that both oxidation and reduction of the contact mass are performed in the same reactor chamber thus has advantages compared to conventional devices as described in GB 902 338.

Hydrogen is recovered in the method according to the invention from steam or water. Excess water is preferably separated from the produced compressed hydrogen by feeding the compressed hydrogen discharged from the reactor to a steam separator. Preferably at least 10%, even more preferably at least 20%, even more preferably at least 30%, even more preferably at least 40%, even more preferably at least 50%, even more preferably at least 60%, even more preferably at least 70%, even more preferably at least 80%, even more preferably at least 90%, even more preferably at least 95%, and in particular 100% of the water of the hydrogen/water mixture leaving the reactor is removed by this method step. The steam separation is based on a condenser in accordance with a preferred embodiment of the present invention.

The method according to the invention comprises a first step in which water is reacted in the presence of metal to form hydrogen and the metal is reacted to form a metal oxide. In order to reduce the metal oxide from this first step to metal and therefore in order to "regenerate" the metal-containing contact mass, a further method step is preferably performed. The metal oxide produced in a first step is regenerated or reduced as a result. The step of "regeneration" is performed in accordance with the invention in the reactor chamber of the device according to the invention, whereby it is not necessary to remove the contact mass that is to be regenerated from the reactor. In the case of conventional methods, as described for example in GB 902 338, the contact mass is by contrast removed from the reactor, regenerated, and then re-introduced into the reactor chamber. A separate reactor is therefore required for this type of regeneration of the contact mass.

In accordance with a further preferred embodiment of the present invention, the method according to the invention comprises a second step, which is independent of the first step of reacting evaporated water with the metal of the contact mass to form hydrogen and of reacting the metal to form metal oxide, and in which the metal oxide of the metal-containing contact mass from the first step is reduced at least in part to metal with a gas mixture comprising carbon monoxide and/or hydrogen and/or methane and/or long-chain hydrocarbons. Gas mixtures of this type are produced for example during the production of synthesis gas from petroleum fractions, such as diesel, as described below. The term "long-chain hydrocarbons" as used herein includes hydrocarbons having more than one carbon atom, preferably with a chain length of more than 2, 3, 4 or 5 carbon atoms. Suitable gas mixtures can also comprise alcohols of hydrocarbons (for example methanol or ethanol).

The oxidation reaction can be carried out in alternation with the reduction reaction in the same reactor. The process of producing compressed hydrogen can thus be performed continuously if the method according to the invention is carried out in at least two reactors in a staggered manner. A reduction step and an oxidation step take place in alternation in each of the reactors. Each reaction step is followed by execution of the other reaction step.

In accordance with a preferred embodiment of the present invention, the gas mixture comprising carbon monoxide and hydrogen is produced from a gasifiable carbon-containing starting material in a synthesis gas area located preferably within the reactor chamber and comprising a catalyst and/or a non-catalytic solid, and is conducted into the area comprising the at least partly oxidised metal-containing contact mass.

In accordance with the invention, any source for a gas mixture comprising carbon monoxide and/or hydrogen and/or methane and/or long-chain hydrocarbons can be used in order to reduce the oxidised metal of the metal contact mass or the metal oxides at least in part. However, it is particularly preferred when the gas mixture comprising carbon monoxide and hydrogen or the synthesis gas is produced directly in the reactor itself. Gasifiable carbon-containing starting materials could therefore be introduced directly into the reactor, whereby an additional synthesis gas reactor can be spared.

All substances and substance mixtures known for the production of synthesis gas can be used as "gasifiable carbon-containing starting materials" and can be solid, liquid, or gaseous. Solid gasifiable starting materials can be, for example, carbon or biomass, such as wood or straw. Crude oil distillates (fractions with a low boiling point and/or high boiling point), but also alcohols (for example methanol, ethanol, or propanol) can be used as liquid starting materials for synthesis gas. Gaseous starting materials include, inter alia, methane, biogas, natural gas and/or liquid gas. Oxidising agents (for example air and/or oxygen and/or steam and/or carbon dioxide) are additionally added as necessary to these starting materials.

The synthesis gas area within the reactor according to the invention preferably comprises a catalyst which is preferably selected from the group consisting of metals, metal oxides, and combinations thereof, in particular nickel, cobalt, ruthenium, platinum, palladium, gold, iron, MgO, $Al_2O_3$, $SiO_2$, CuO, or $CeO_2$. Of course, any type and form of catalysts which are usually used in the production of synthesis gas can be used in the method according to the invention.

If a non-catalytic solid is used in the synthesis gas area in the method according to the invention, said solid is preferably selected from the group consisting of nickel oxide, iron oxide, copper oxide, tungsten oxide, and combinations thereof. The non-catalytic solid does not have to be able to react with steam to form metal oxide and hydrogen. For example, nickel and copper are therefore also possible. The non-catalytic solid will be oxidised with air, for example, so as to form its oxide again (regeneration step similar to steam oxidation of, for example, iron in the reactor area comprising the metal-containing contact mass).

In order to improve the energy efficiency of the method according to the invention, it is particularly preferred to discharge from the reactor the gas mixture ("waste gas") produced in the second step, i.e. the "reduction step" (reduction of the oxidised metal of the metal-containing contact mass) and to use said gas mixture in order to control the temperature of the reactor and/or of the carbon-containing starting material to be introduced into the reactor. Here, it is possible to use the waste heat of the gas mixture discharged from the reactor, or the gas mixture ("waste gas") itself is burned for heat recovery.

In accordance with a particularly preferred embodiment of the present invention, the gas mixture comprising carbon monoxide and hydrogen is produced from a carbon-containing starting material in an area disposed within the reactor chamber for partial oxidation of a carbon-containing starting material, which optionally comprises a catalyst for the partial oxidation, and is conducted into the area comprising the at least partly oxidised metal-containing contact mass.

The catalyst for the partial oxidation is preferably selected from the group consisting of metals, metal oxides, and combinations thereof, in particular nickel, cobalt, ruthenium, platinum, palladium, gold, iron, MgO, $Al_2O_3$, $SiO_2$, CuO, or $CeO_2$.

In the case of the partial oxidation, a sub-stoichiometric fuel-air mixture is partially burned in the presence of a catalyst, wherein a synthesis gas rich in hydrogen is produced. In order to reduce or suppress the formation of elemental carbon, water and/or steam are/is admixed during the partial oxidation.

In accordance with a preferred embodiment of the present invention, the partial oxidation is carried out in at least one reaction area, preferably a line, in the reactor chamber, wherein the at least one reaction area is guided through the area comprising the metal-containing contact mass so as to utilise the heat created during the partial oxidation in order to heat the metal-containing contact mass. As a result of this approach, the energy efficiency of the method according to the invention is significantly increased, since the heat required for the reduction of the metal-containing contact mass does not have to be introduced at the insulated and pressure-strengthened outer shell of the reactor, but inside the reactor. It is particularly advantageous if a number of reaction areas for the partial oxidation, preferably a number of lines, penetrate the metal-containing contact mass.

In accordance with a preferred embodiment of the present invention, the synthesis gas area or the area for partial oxidation of a carbon-containing starting material is separated from the metal-containing contact mass by a gas-permeable inert area. In the method according to the invention, the gas or gas mixture formed in the synthesis gas area or in the area of the partial oxidation is thus initially guided preferably into an inert area within the reactor chamber, and then to the metal-containing contact mass. This gas guidance has the advantage that any solid carbon or also other impurities (for example sulphur compounds) formed during the production of the synthesis gas or during the partial oxidation do not pass into the area of the metal-containing contact mass, whereby the efficiency of the hydrogen production remains substantially untainted by any impurities, and the purity of the hydrogen can be increased.

In accordance with a further preferred embodiment of the present invention, the compressed hydrogen is discharged from the reactor chamber from the inert area between the synthesis gas area or the area for partial oxidation of a carbon-containing starting material. As a result of the discharge of the compressed hydrogen from the reactor chamber from the aforementioned inert area, it is possible to produce highly pure compressed hydrogen.

In accordance with a preferred embodiment of the present invention, the metal-containing contact mass of the device according to the invention has the form of a metal sponge, pellet, powder, granulate, or a combination thereof.

In accordance with a further preferred embodiment of the present invention, the metal-containing contact mass comprises a metal and/or metal oxide selected from the group consisting of iron, iron oxide, molybdenum, molybdenum oxide, tungsten, tungsten oxide, germanium, germanium oxide, and combinations thereof.

In order to increase the stability and reactivity of the contact mass, the contact mass preferably comprises additional metal oxides.

In accordance with a preferred embodiment of the present invention, the additional metal oxides are selected from the group consisting of CoO, $GeO_2$, CuO, $NiO_2$, $PtO_2$, $Na_2O$, $In_2O_3$, $Li_2O$, $WO_3$, $Ag_2O$, ZnO, RuO, NiO, $Fe_2O_3$, $RuO_2$, $Ga_2O_3$, PtO, $Nb_2O_5$, $MnO_2$, $In_2O_3$, PdO, $K_2O$, $SnO_2$, $TiO_2$, $Cr_2O_3$, HfO, $ZrO_2$, $VO_2$, $CeO_2$, $Y_2O_3$, CaO, $MoO_2$, $SiO_2$, $La_2O_3$, MgO, $SC_2O_3$, SrO, $Al_2O_3$, and combinations thereof.

In accordance with a particularly preferred embodiment of the present invention, the reactor chamber has at least two areas that are separate from each other and are connected to each other in a gas-conducting manner, of which at least one area comprises the metal-containing contact mass and at least one additional area comprises at least one inert material.

In accordance with a preferred embodiment of the present invention, the discharge line protruding into the reactor chamber opens directly into the area comprising the inert material.

The reactor according to the invention has feed lines and discharge lines, by means of which fluids (gases and liquids, such as water) can be introduced into the reactor. These lines preferably open into an area comprising an inert material. In other words, the fluids that can be introduced into the reactor are not brought directly into contact with a chemically reactive material.

The discharge line protruding into the reactor chamber, by means of which line fluids such as the compressed hydrogen can be discharged from the reactor, is preferably connected to a steam separator. The steam separator serves to separate water contained in the compressed hydrogen in order to produce pure hydrogen.

In accordance with a further preferred embodiment of the present invention, at least one synthesis gas area is arranged in the reactor chamber and comprises a catalyst and/or a non-catalytic solid. In addition to the at least one area with metal contact mass, at least one synthesis gas area can additionally be arranged in the reactor chamber. These two areas are physically separate from one another, but are connected to each other in a gas-conducting manner. The different chemical reactions can therefore take place separately in the corresponding areas in the reactor chamber.

The catalyst of the synthesis gas area is preferably selected from the group consisting of metals, metal oxides, and combinations thereof, in particular nickel, cobalt, ruthenium, platinum, palladium, gold, iron, MgO, $Al_2O_3$, $SiO_2$, CuO, or $CeO_2$.

The non-catalytic solid of the synthesis gas area is preferably selected from the group consisting of nickel oxide, iron oxide, copper oxide, tungsten oxide, and combinations thereof.

In accordance with a further preferred embodiment of the present invention, at least one area for partial oxidation of a carbon-containing starting material is arranged in the reactor chamber and comprises a catalyst for the partial oxidation.

In accordance with a preferred embodiment of the present invention, the catalyst for the partial oxidation is selected from the group consisting of metals, metal oxides, and combinations thereof, in particular nickel, cobalt, ruthenium, platinum, palladium, gold, iron, MgO, $Al_2O_3$, $SiO_2$, CuO, or $CeO_2$.

The reactor chamber preferably has a number of areas for partial oxidation in the form of lines, wherein the lines are guided through the area comprising the metal-containing contact mass. In the case of the partial oxidation, a substoichiometric fuel-air mixture is partially burned, and a synthesis gas rich in hydrogen is produced. The heat created during the partial oxidation can be used to heat the metal-containing contact mass. The energy efficiency of the hydrogen production can thus be improved. The provision of more than one line (for example more than two, more than three, more than four, more than five, more than six, more than eight, more than ten, more than 15, more than 20, more than 30), in which a partial oxidation can be carried out, within the metal-containing contact mass is particularly preferred.

In accordance with a preferred embodiment of the present invention, the synthesis gas area or the area for partial oxidation is separated from the metal-containing contact mass by a gas-permeable inert area.

In accordance with a further preferred embodiment of the present invention, an opening of the at least one discharge line protruding into the reactor chamber is arranged in the inert area between the synthesis gas area or the area for partial oxidation and the area of the contact mass.

Due to the discharge of the hydrogen from the inert area, it is possible to produce hydrogen of higher purity than with the removal of the hydrogen directly from the synthesis gas area or the area for partial oxidation. It is therefore particularly preferred if the opening or the openings of the discharge line or discharge lines is/are disposed in the inert area.

The present invention will be presented in greater detail with reference to the following drawings, without being limited thereto.

Figure 1:
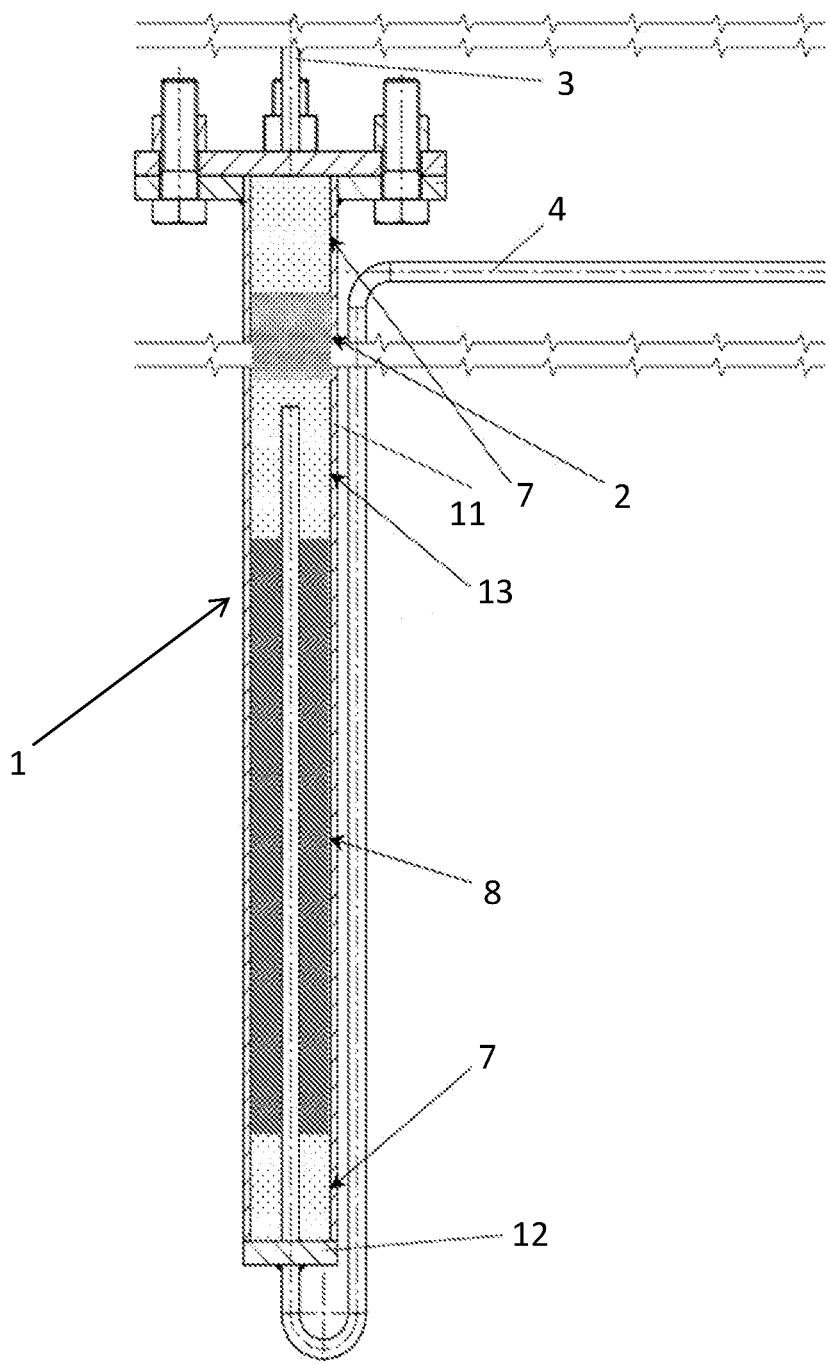
FIGS. 1 to 3 show a section through a reactor according to the invention.

FIG. 1 shows a reactor 1 according to the invention, in the interior of which there is arranged a metal-containing contact mass 2. The metal-containing contact mass 2 comprises substantially a material that can be reversibly oxidised and reduced between a metal form and an oxidic form. The reactor 1 has a feed line 3, by means of which water or steam can be brought into an inert area 7 in the end region of the reactor 1. The inert and reactive areas of the reactor chamber within the reactor tube 11 are connected to each other in a gas-conducting manner, such that water or steam fed by means of the feed line can reach the metal-containing contact mass 2.

A synthesis gas area 8 is arranged in the reactor illustrated in FIG. 1. This area serves to provide a gas mixture from a gasifiable carbon-containing starting material, which gas mixture, under suitable conditions (for example at a temperature of from 300° C. to 1200° C.), is able to at least partly reduce metal oxide provided in the metal contact mass to metal. The gasifiable carbon-containing starting material can be introduced into the reactor chamber (either into the synthesis gas area or an inert area 7 upstream of said synthesis gas area) directly at the tube bottom 12 of the reactor. An inert area 13 is provided between the synthesis gas area 8 and the metal-containing contact mass 2 (this is the area in which hydrogen is recovered from water in the presence of metal). This additional inert area 13 has the advantage that any gaseous impurities which are still provided in the synthesis gas area from the reduction or which can be formed as secondary products during the oxidation do not pass into the hydrogen produced as a result of the oxidation. In addition, any undesired impurities (for example solid carbon) from the synthesis gas area 8 or from the synthesis gas reaction are detained prior to the infiltration into the metal-containing contact mass 2.

The compressed hydrogen produced in the reactor according to the invention is preferably removed from the reactor by means of a discharge line 4, which opens into an inert area 13, which is connected to the metal-containing contact mass 2 in a gas-conducting manner. The removal of the hydrogen from the inert area 13 is advantageous since a hydrogen/water mixture containing fewer impurities can be obtained as a result.

Figure 2:
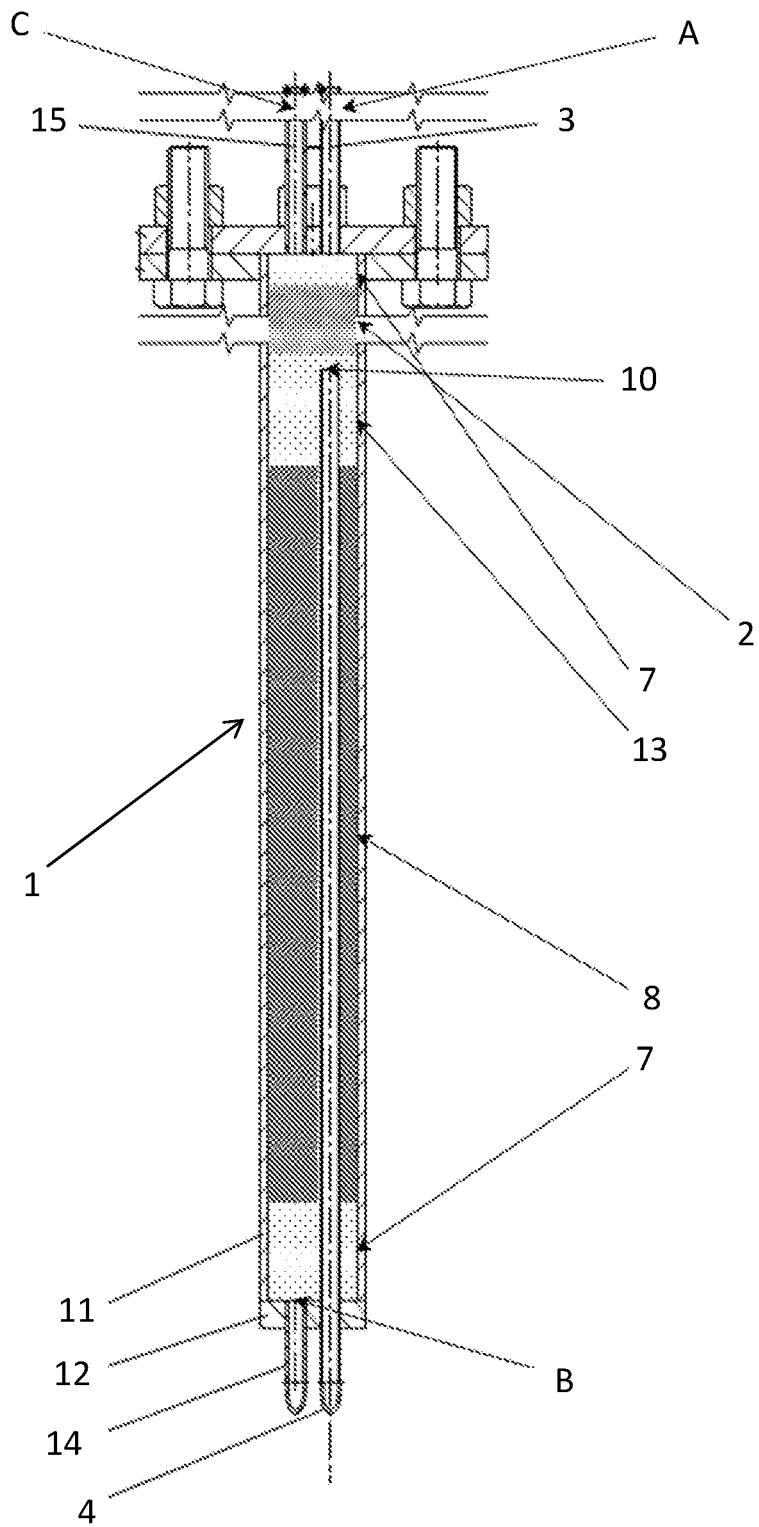

FIG. 2 shows a cross-section of a reactor 1 according to the invention. As mentioned in the introduction, the method according to the invention can comprise an oxidation step or an oxidation and reduction step. In the oxidation step a metal, for example iron, or metal oxide is brought into contact at a specific temperature with water, whereby metal oxide and hydrogen are produced. In the reduction step the metal oxide formed in the oxidation step is reduced to metal or a metal oxide, with a gasifiable carbon-containing starting material (for example methane with water) being used. Depending on the method step, different lines for introducing and removing gases and gas mixtures into and from the reactor can be used in the device illustrated in FIG. 2.

During the oxidation step, water can be introduced directly or indirectly via the inert area 7 into the area with the metal-containing contact mass 2 by means of the opening A of the feed line 3. The hydrogen formed during the course of the oxidation or the produced hydrogen/hydrogen mixture is removed from the reactor via the opening 10 of the discharge line 4. In order to increase the pressure during the oxidation within the reactor or reactor chamber, all feed lines (apart from the feed line 3) and discharge lines into and from the reactor are closed by means of devices disposed thereon for controlling or regulating the flow rate, preferably by means of a valve. The opening 10 of the discharge line 4 can additionally be connected to a water separator, which can remove water contained in the compressed hydrogen. The feed line 3 is coupled to a conveyance means for conveying media that contain water.

During the course of the reduction step, a gasifiable carbon-containing starting material (for example methane with water) is introduced into the synthesis gas area 8 through the opening B of a feed line 14 via an inert area 7. The gasifiable carbon-containing starting material could alternatively be transported directly into the synthesis gas area 8. A discharge line 15 located on the reactor discharges the gas mixture (for example comprising $CO_2$, CO, $H_2O$ and $H_2$) produced during the reduction of the metal-containing contact mass 2 from the reactor 1 via the opening C.

Figure 3:
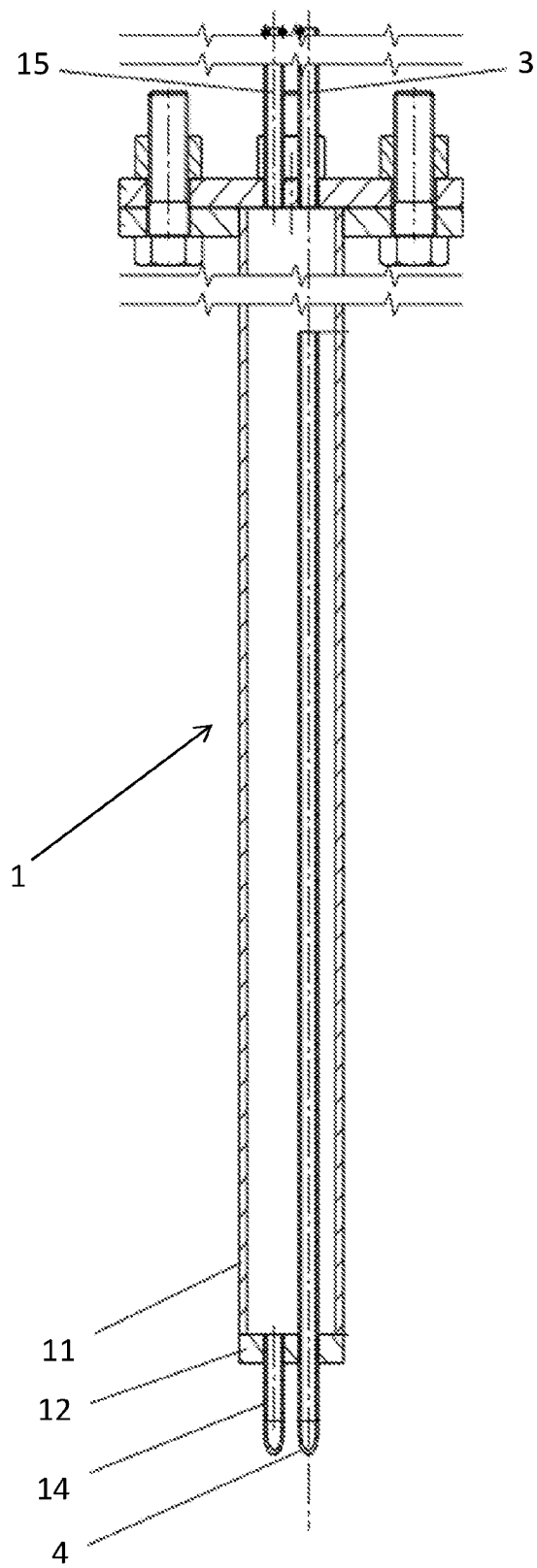

FIG. 3 shows a reactor 1 according to the invention without the incorporated areas.

Figure 4:
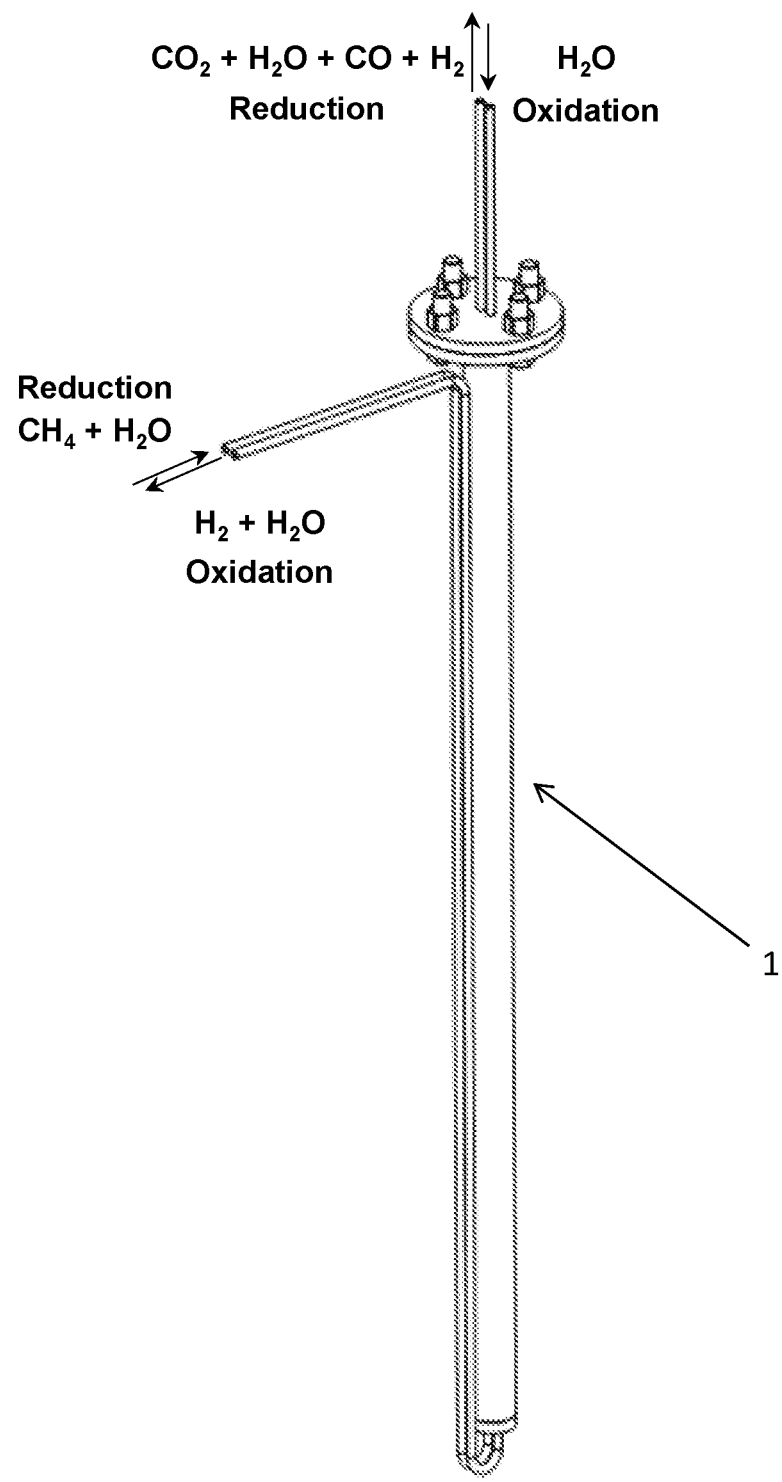
FIG. 4 shows an external view of a reactor.

FIG. 4 shows the external view of a reactor 1 according to the invention. Exemplary fluids which are removed from and introduced into the reactor during the oxidation step and reduction step are indicated jointly with the flow directions.

Figure 5:
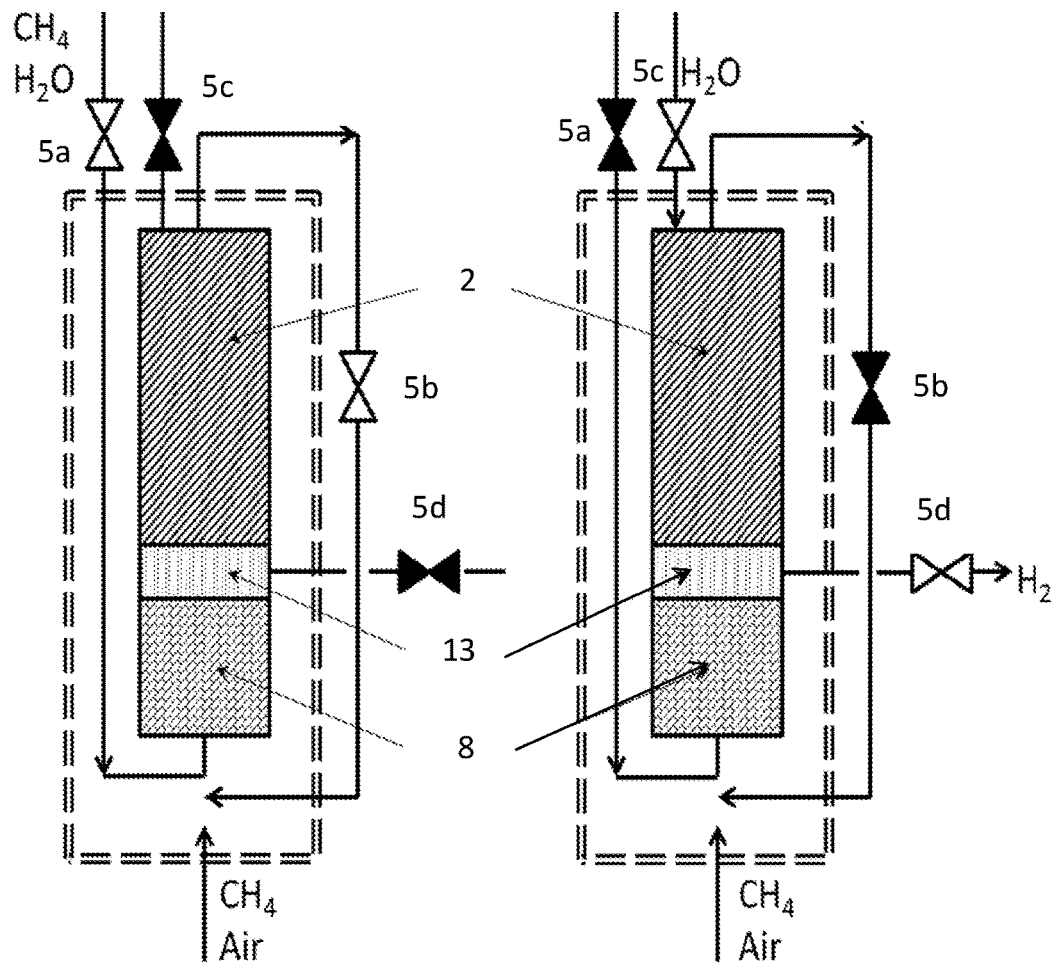
FIGS. 5 and 6 show a schematic illustration of the reactor and method according to the invention.

FIG. 5 schematically shows two images of the reactors according to the invention and the positions (open—white, closed—black) of the devices, fitted on the feed and discharge lines, for controlling or regulating the flow rate, preferably the valves (5a, 5b, 5c, 5d). During the reduction reaction, the valve on the feed line is opened in order to introduce the gasifiable carbon-containing starting material (5a) (for example methane/water). In so doing, the gasifiable carbon-containing starting material flows through the synthesis gas area 8, the inert area 13, and the metal-containing contact mass 2 of the reactor, wherein the gas mixture leaving the reactor when the valve 5b is opened can be used in order to heat the gasifiable carbon-containing starting material that is to be introduced and in order to heat the entire process.

During the oxidation reaction, all openings apart from the valve 5c on the feed line for water into the reactor are closed, in order to increase the pressure within the reactor. The valve 5d is opened accordingly once a predefined pressure within the reactor has been reached, in order to remove compressed hydrogen from the reactor.

Figure 6:
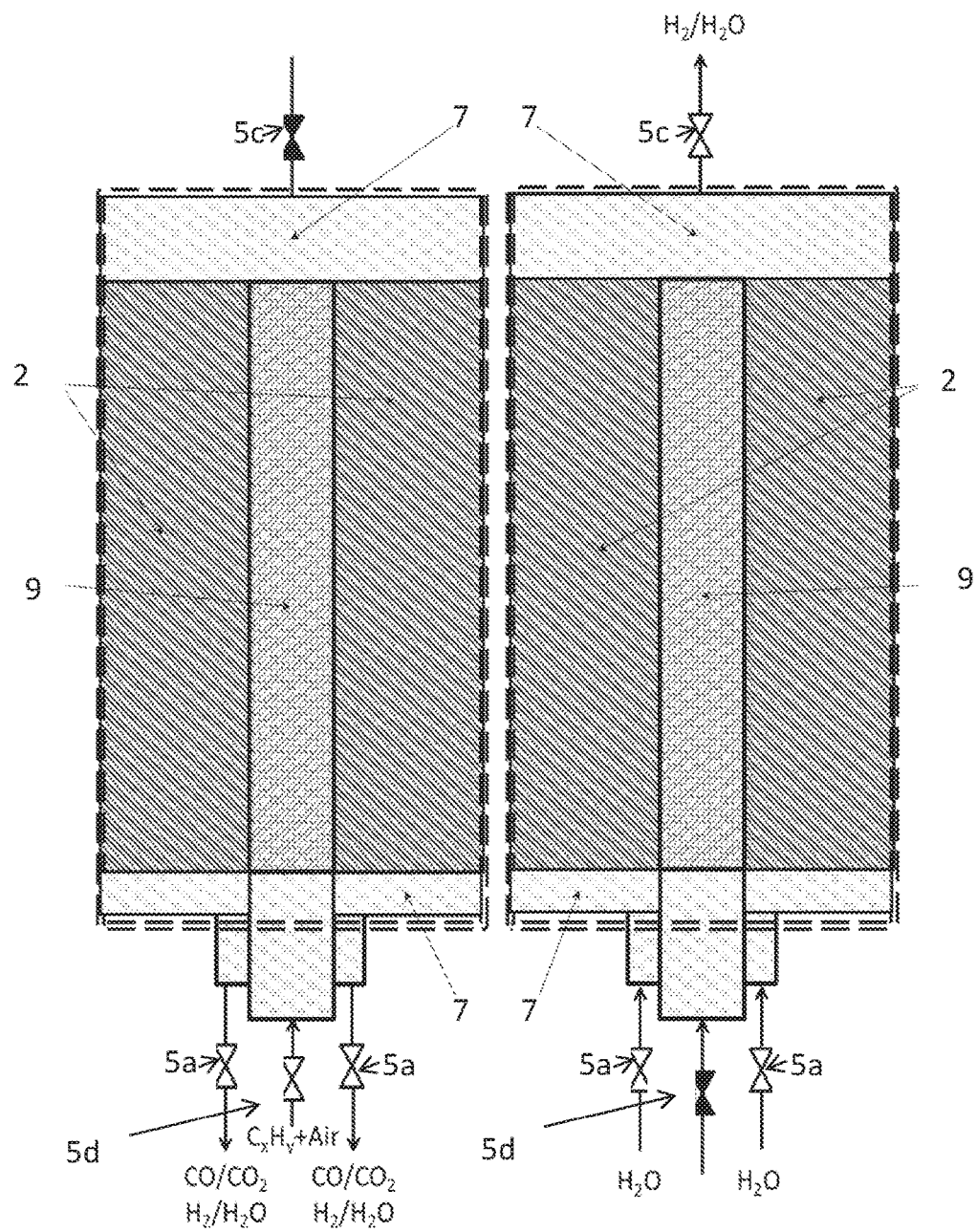

FIG. 6 shows an alternative embodiment of the reactor 1 according to the invention, in which the area of partial oxidation 9 is integrated into the area of the metal-containing contact mass 2. The area of partial oxidation 9 is disposed in a tube or a line located within the area of the metal-containing contact mass 2. From a structural point of view, the line 14 from FIG. 2 in the simplest case could be extended to just before the reactor end and filled with a solid material. This arrangement is especially expedient when the synthesis gas is produced by means of an exothermic reaction (for example catalytic partial oxidation).

$$C_xH_y + x/2 O_2 \rightarrow xCO + y/2 H_2 \text{(partial oxidation)}$$

In this case, the heat created during the production of the synthesis gas is used in order to supply energy to the endothermic reduction. Waste gas of the reduction can additionally be used for the recovery of process heat. The line with valve 5b in FIG. 5 is in this case optional, but can be used as necessary for regeneration reactions and air oxidations.

A device according to FIG. 6 can also have inert areas (7).

The method according to the invention, which is preferably carried out with the device according to the invention, comprises at least one oxidation step in which water is reacted with metal to form hydrogen and metal oxide. In order to reduce the metal oxide at least in part to metal and thus regenerate the metal-containing contact mass for the next oxidation cycle, the contact mass is reduced at least in part, as presented in the following general example.

Reduction:

A hydrocarbon (for example methane) is mixed with steam and then conducted into the reactor via an area comprising inert material, the gas mixture being brought to reaction temperature in the reactor. The mixture then reaches the synthesis gas area. Either a catalyst or a non-catalytic solid (metal oxide $M_wO_z$, wherein M stands for metal and w and z are integers) is disposed in this area for the production of synthesis gas. With use of a catalyst, the following general reaction (1) takes place (x and y are integers).

$$C_xH_y + xH_2O \rightarrow xCO + (x+y/2)H_2 \quad (1)$$

With the use of a non-catalytic solid, synthesis gas can be produced via reaction (2)

$$C_xH_y + MO \rightarrow xCO + y/2 H_2 + M \quad (2)$$

In both cases, solid carbon ($C_s$) can form as a result of secondary reactions (3 and 4).

$$C_xH_y \rightarrow xC_s + y/2 H_2 \quad (3)$$

$$2CO \rightarrow C_s + CO_2 \quad (4)$$

Other impurities, such as sulphur compounds, are also collected here or, if necessary, already in the inert area or outside the reactor. In this case, the first inert area has the function of a filter or absorber/adsorber.

The synthesis gas is conducted via the second inert area. As required, filter or absorber/adsorber material can also be used here additionally. The synthesis gas then reaches the metal-containing contact mass. There, the reduction of the metal oxide (here iron oxide by way of example) takes place (5 and 6).

$$Fe_3O_4 + H_2/CO \rightarrow 3FeO + H_2O/CO_2 \quad (5)$$

$$3FeO + 3H_2/CO \rightarrow 3Fe + 3H_2O/CO_2 \quad (6)$$

Oxidation:

Water is conducted into the reactor in counter flow and is evaporated there. The steam reacts with iron and produces hydrogen (7 and 8).

$$3Fe + 3H_2O \rightarrow 3FeO + 3H_2 \quad (7)$$

$$3FeO + H_2O \rightarrow Fe_3O_4 + H_2 \quad (8)$$

The hydrogen is conducted away through a second line (for example tube), which opens into an inert area between the metal-containing contact mass and the synthesis gas area. Because the hydrogen is conducted via this line, it cannot enter into a reaction with the impurities present in the synthesis gas area, and there is also no contamination of the produced hydrogen. The steam/hydrogen mixture present is conducted into a condenser, in which the steam condenses. An arbitrary hydrogen pressure can be set by closing order limiting the gas flow at the condenser outlet.

Regeneration:

By reaction with steam or a small proportion of the produced hydrogen, contaminations of the synthesis gas area can be removed, whereby this area is regenerated. In addition, the area can then be oxidised with air as necessary in order to remove contaminations or in order to form metal oxide again, which reacts again in the next cycle via reaction 2.

The possibility of carrying out this step is an advantage of the reactor design, but a regeneration step is not absolutely necessary in every case.

In the event of air oxidation, the following reaction occurs in addition to the further oxidation of the contact mass:

$$2Fe_3O_4 + 1/2 O_2 \rightarrow 3Fe_2O_3 \text{(9; after reaction 8)}$$

The next reduction cycle then starts with:

$$3Fe_2O_3 + H_2/CO \rightarrow 2F_3O_4 + H_2O/CO_2 \text{(10; before reaction 5)}$$

The invention claimed is:

1. A method for producing compressed hydrogen in a device comprising a pressure-resistant reactor with a reactor chamber having a metal-containing contact mass, wherein the reactor comprises at least one feed line for feeding fluids into the reactor chamber and at least one discharge line for discharging fluids from the reactor chamber, wherein the at least one discharge line is provided with a device for controlling a flow rate, optionally having a valve, for adjusting the pressure within the reactor chamber, wherein a conveyance means is provided on the at least one feed line for introducing a water-containing medium into the reactor chamber, and wherein the at least one discharge line protrudes into the reactor chamber or opens directly into the reactor chamber, through which compressed hydrogen is discharged from the reactor chamber, wherein the reactor chamber has at least two areas that are separate from each other and are connected to each other in a gas-conducting manner, of which at least one area comprises the metal-containing contact mass and at least one additional area comprises at least one inert material, the reactor chamber further comprising at least one synthesis gas area and comprising a catalyst and/or a non-catalytic solid, said method comprising a first step of introducing a water-containing medium into the reactor chamber of the pressure-resistant reactor of the device by means of the conveyance means, optionally a pump, wherein the water-containing medium is evaporated before or in the reactor chamber, whereby the pressure within the reactor chamber rises above the ambient pressure, and the evaporated water is reacted with the metal of the contact mass to form hydrogen, and the metal is reacted to form metal oxide, wherein the compressed hydrogen is discharged from the reactor chamber by means of a line protruding into the reactor chamber or opening directly into the reactor chamber, wherein the pressure within the reactor chamber is controlled using a device, provided on the discharge line, for controlling the flow rate, optionally using a valve, further comprising a second step, which is independent of the first step of reacting evaporated water with the metal of the contact mass to form hydrogen and of reacting the metal to form metal oxide, and in which the metal oxide of the metal-containing contact mass from the first step is reduced at least in part to metal with a gas mixture comprising carbon monoxide and/or hydrogen and/or methane and/or long-chain hydrocarbons.

2. The method according to claim 1, characterised in that the pressure within the reactor chamber is controlled by the conveyance means and one or more devices for controlling the flow rate in lines leading into and from the reactor chamber.

3. The method according to claim 1, characterised in that the pressure when reacting evaporated water with the metal of the contact mass to form hydrogen is at least 2 bar.

4. The method according to claim 1, characterised in that the line protruding into the reactor chamber or opening directly into the reactor chamber, protrudes or opens into the area comprising the inert material, and the compressed hydrogen is discharged from the reactor chamber via the at least one additional area comprising the at least one inert material.

5. The method according to claim 1, characterised in that the compressed hydrogen discharged from the reactor chamber is fed to a steam separator in order to separate water from the compressed hydrogen.

6. The method according to claim 1, characterised in that the gas mixture comprises carbon monoxide and hydrogen, and is produced from a gasifiable carbon-containing starting material in the at least one synthesis gas area.

7. The method according to claim 1, characterised in that the gas mixture is discharged from the reactor after reducing the metal oxide in the second step and is used to control the temperature of the reactor.

8. The method according to claim 1, characterised in that the gas mixture comprises carbon monoxide and hydrogen, and is produced from a carbon-containing starting material in an area disposed within the reactor chamber for partial oxidation of the carbon-containing starting material, which area disposed within the reactor chamber optionally comprises a catalyst for the partial oxidation.

9. The method according to claim 8, characterised in that water and/or steam are/is admixed during the partial oxidation of the carbon-containing starting material in order to reduce or suppress the possible formation of carbon.

10. The method according to claim 8, characterised in that the partial oxidation is carried out in at least one reaction area, optionally a line, in the reactor chamber, wherein the at least one reaction area is guided through the at least one area comprising the metal-containing contact mass so as to utilise the heat produced during the partial oxidation in order to heat the metal-containing contact mass.

11. The method according to claim 1, characterised in that the compressed hydrogen is discharged from the reactor chamber from a gas-permeable inert area between the at least one synthesis gas area and the at least one area of the metal-containing contact mass.

12. The method according to claim 1, characterised in that the pressure when reacting evaporated water with the metal of the contact mass to form hydrogen and when reacting the metal to form metal oxide is at least 4 bar.

13. The method according to claim 1, characterised in that the pressure when reacting evaporated water with the metal of the contact mass to form hydrogen and when reacting the metal to form metal oxide is at least 6 bar.

14. The method according to claim 1, characterised in that the pressure when reacting evaporated water with the metal of the contact mass to form hydrogen and when reacting the metal to form metal oxide is at least 10 bar.

15. The method according to claim 6, characterised in that the gas mixture is discharged from the reactor after reducing the metal oxide in the second step and is used to control the temperature of the gasifiable carbon-containing starting material.

16. The method according to claim 8, characterised in that the compressed hydrogen is discharged from the reactor chamber from a gas-permeable inert area between the area for partial oxidation of a carbon-containing starting material and the at least one area of the metal-containing contact mass.

* * * * *